UNITED STATES PATENT OFFICE.

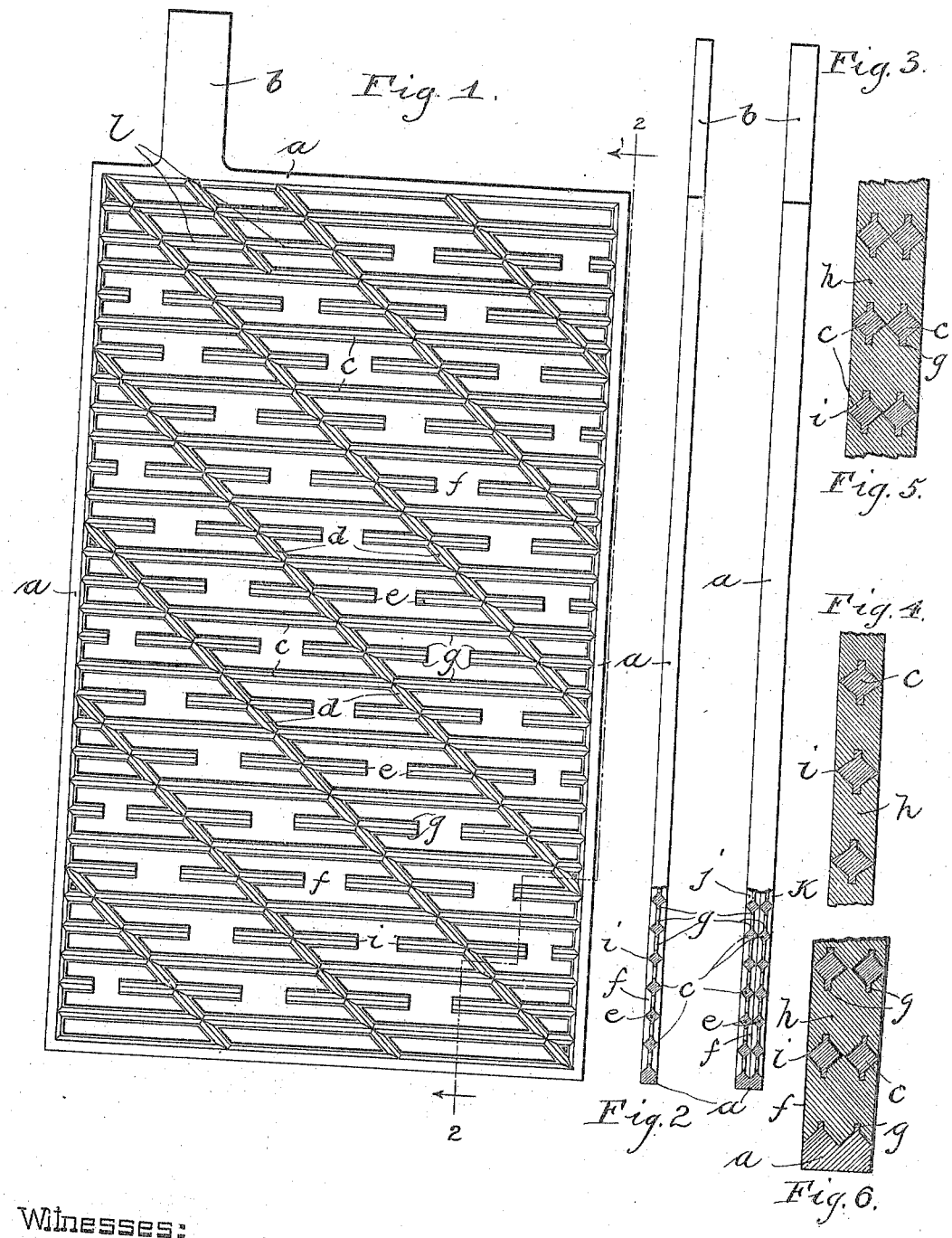

JAMES R. MACMILLAN, OF MENOMONIE, WISCONSIN, ASSIGNOR TO NORTH-WESTERN STORAGE BATTERY COMPANY, OF CHICAGO, ILLINOIS, A CORPORATION OF ILLINOIS.

STORAGE BATTERY.

No. 817,498.   Specification of Letters Patent.   Patented April 10, 1906.

Application filed April 1, 1905. Serial No. 253,207.

*To all whom it may concern:*

Be it known that I, JAMES R. MACMILLAN, a citizen of the United States, residing at Menomonie, in the county of Dunn and State of Wisconsin, have invented a certain new and useful Improvement in Storage Batteries, of which the following is a full, clear, concise, and exact description, reference being had to the accompanying drawings, forming a part of this specification.

My invention relates to storage batteries, and has for its object an improved element or plate therefor.

More particularly my invention has for its object an improved construction of a unit frame or grid for supporting the active material.

As the amount of electrical energy which can be stored in a cell is proportional to the amount of active material exposed to the electrolyte, it is essential that to obtain the greatest efficiency the grids or frames for the plate should be so constructed and arranged that when the active material is in place a maximum surface of active material together with a minimum weight of plate should be obtained. At the same time a large supporting area and a sufficient contact area for the active material must be afforded, as also retention means for holding the active material in place on the grid. The unit of my improved grid is preferably rectangular and in the form of a gridiron having transverse ribs, said transverse ribs forming with other preferably horizontal ribs compartments for lodgment of the active material. Projections or teeth extend preferably horizontally from the transverse ribs into the compartments to serve as additional supporting and contact means for the active material. A cross-section of the ribs has preferably the shape of a flattened rhombus, the top and lower edges slightly extending to form thin webs to increase the contact area. I preferably extend the transverse ribs across the frame at an angle of about forty-five degrees to afford additional supporting-base for the active material and at the same time serving to strengthen and stiffen the grid.

Each grid may consist of a single unit or may be composed of two or more such units. These units may be secured together at all their contact-surfaces or may be secured together only at their edges or rims. I preferably employ only two units, however, per grid and burn or otherwise connect them together at their rims only. I find that by using four such double grids as positive plates and five single grids as negative plates twice the amount of current for the same voltage can be obtained as from a storage-cell employing six single negative grids and five single positive grids. In the first cell we thus have thirteen single grids and in the second cell eleven single grids; but to compensate for the difference in weight the units of the double grids may be made slightly lighter, and I therefore am enabled to produce a storage-cell delivering twice as much current with the same voltage and weight as a cell composed of but single grids. Furthermore, where the plates are thus built up of units the cell will withstand a much higher rate of charge and discharge.

My invention will be best understood with reference to the accompanying drawings, in which—

Figure 1 is a side elevation of a grid, showing the arrangement of the ribs and projections. Fig. 2 is a section view taken on line 2 2 of Fig. 1 and shows a single grid. Fig. 3 is a view similar to Fig. 2, but showing the grid composed of two units. Fig. 4 is an enlarged sectional view of part of a single grid. Fig. 5 is a sectional view of part of a double grid, showing the edges of the units as touching; and Fig. 6 shows a sectional view of part of a double grid, showing the units touching and connected together at the rims thereof.

The unit is preferably rectangular, as shown, and consists of a narrow comparatively heavy rectangular inclosing frame or rim $a$, supporting a connecting lug $b$, ribs $c$, preferably horizontal, and ribs $d$, running transversely across the unit, preferably at an angle of about forty-five degrees, although any other angle may be employed. Short projections or teeth $e$, integral with said transverse ribs $d$, extend preferably horizontally into the compartments $f$, formed between the intersecting ribs $c$ and $d$. These ribs and projections are shaped as best shown in Figs. 4, 5, and 6, the cross-section thereof having the shape of a diagonally-flattened rhombus, the top and lower edges being extended to form thin webs $g$. The surfaces of the ribs thus form wedges which project into the active material h and serve to retain it in place, and the projections e by extending into the active material afford additional retention means as well as increased contact-surface. The webs g also give an abundance of contact-surface without materially increasing the weight of the unit and serve also to retain the active material.

As the ribs c and d and projections e come to sharp edges i at the faces of the unit, the active material may safely be applied to entirely surround the ribs and projections, and therefore the active surface of the active material will practically be equal to the area of the unit. As the entire current delivered by the grid must pass to the terminal b thereof, the projections l near these lugs are preferably continuous, as shown, to afford greater conductive section.

The storage-cell may be entirely composed of single grids or units suitably arranged or each grid may be formed of a plurality of units, as shown in Fig. 3, where two units j and k are shown connected together. The units of a double grid thus formed may be securely connected together at all their adjacent edges or may be secured together by their rims only and merely touching at the adjacent rib edges, but not firmly connected together, or they may also be arranged, as shown in Fig. 6, with their edges or rims securely connected together and the units slightly bulged or bent away from each other. The grid by being thus formed of units is greatly strengthened against all the strains which it would be subject to in storage-battery cells. The active material is thus stronger and more efficiently held in position on the grid, and the last arrangement referred to is perhaps preferable, as the active material will be connected together between the edges of the ribs of the adjacent units. The rims of the units may be conveniently burned or soldered together.

Having thus described my invention, I claim, as new and desire to secure by Letters Patent—

1. In a storage-battery grid unit, the combination of an inclosing frame, a plurality of horizontal ribs extending across said frame, a plurality of transverse ribs extending across said frame and intersecting said horizontal ribs to form compartments for lodgment of active material, projections on said transverse ribs extending into said compartments, said ribs and projections being quadrilateral, the top and lower edges thereof being disposed in a common vertical plane, and a web on said ribs and projections, disposed in said vertical plane, substantially as described and for the purpose set forth.

2. In a storage-battery grid unit, the combination of an inclosing frame, a plurality of horizontal ribs extending across said frame, a plurality of transverse ribs extending across said frame and intersecting said horizontal ribs to form compartments for lodgment of active material, projections on said transverse ribs extending horizontally into said compartments, said ribs and projections being quadrilateral, the top and lower edges thereof being disposed in a common vertical plane, and a web on said ribs and projections, disposed in said vertical plane, substantially as described and for the purpose set forth.

3. In a storage-battery grid unit, the combination of an inclosing frame, a plurality of horizontal ribs extending across said frame, a plurality of transverse parallel ribs extending across said frame and intersecting said horizontal ribs to form compartments for lodgment of active material, projections on said transverse ribs extending horizontally into said compartments, said ribs and projections being quadrilateral, the top and lower diagonal edges thereof being disposed in a common vertical plane, and a web on said ribs and projections disposed in said vertical plane, substantially as described and for the purpose set forth.

4. In a storage-battery grid unit, the combination of an inclosing frame, a plurality of horizontal ribs extending across said frame, a plurality of transverse parallel ribs extending across said frame and intersecting said horizontal ribs to form compartments for lodgment of active material, alternate horizontal ribs being partly interrupted between said transverse ribs to form projections on said transverse ribs, said ribs and projections being quadrilateral, the top and lower diagonal edges thereof being disposed in a common vertical plane, and a web on said ribs and projections, disposed in said vertical plane, substantially as described and for the purpose set forth.

5. In an electric storage-battery plate, in combination, a grid unit having an inclosing frame, a plurality of horizontal ribs, and a plurality of transverse parallel ribs intersecting said horizontal ribs at an angle to form compartments, a projection from each transverse rib into each compartment, said ribs and projections being quadrilateral, the top and lower diagonal edges thereof being disposed in a common vertical plane, webs on said ribs and projections disposed in said vertical plane, and active material supported in said compartments and surrounding said ribs and projections, substantially as described.

6. In a storage-battery grid, the combination of an inclosing frame, a plurality of horizontal ribs extending across said frame, and a plurality of parallel ribs extending diagonally across said frame and intersecting said horizontal ribs to form compartments for lodgment of active material, alternate horizontal ribs being partly interrupted between said diagonal ribs to leave projections on said diagonal ribs, substantially as described.

7. In a storage-battery grid unit, the combination of an inclosing frame, a plurality of horizontal ribs extending across said frame, and a plurality of parallel ribs extending diagonally across said frame and intersecting said horizontal ribs to form compartments for the lodgment of active material, the ribs being quadrilateral, the top and lower diagonal edges thereof being disposed in a common vertical plane, said edges being slightly extended to form thin webs disposed in said vertical plane, substantially as described.

8. In a storage-battery grid unit, the combination of an inclosing frame, a plurality of horizontal ribs extending across said frame, a plurality of parallel ribs extending diagonally across said frame and intersecting said horizontal ribs to form compartments for the lodgment of active material, alternate horizontal ribs being partly interrupted between said diagonal ribs to leave projections on said diagonal ribs, all the ribs and projections being quadrilateral, the top and lower diagonal edges thereof being disposed in a common vertical plane, said edges being slightly extended to form thin webs disposed in said vertical plane, substantially as described.

9. A storage-battery plate composed of a plurality of similar grid units having rims, said rims being securely electrically connected together, horizontal ribs for each unit, transverse ribs for each unit, alternate horizontal ribs being interrupted to form extensions, said ribs and extensions being quadrilateral, the upper and lower diagonal edges of the ribs of each unit lying in a common vertical plane, the ribs and projections of all the units coöperating to retain active material in position on the plate.

10. A storage-battery plate composed of similar grid units, firmly electrically connected only at their rims, of horizontal ribs for each unit, diagonally intersecting ribs for each unit, said ribs being quadrilateral and the upper and lower edges of the ribs of each unit being disposed in a common vertical plane, all of said ribs coöperating to form compartments for lodgment of active material, and thin webs extending from the edges of said ribs in the vertical planes.

11. A storage-battery plate composed of a plurality of grid units held together in electrical contact, each unit having horizontal ribs and transverse ribs, alternate horizontal ribs being interrupted to form extensions, said ribs and extensions being quadrilateral with the upper and lower diagonal edges thereof in each unit lying in a common vertical plane, the ribs and projections of all the units coöperating to retain active material in position on the plate.

In witness whereof I hereunto subscribe my name this 23d day of March, A. D. 1905.

JAMES R. MACMILLAN.

Witnesses:
CHARLES J. SCHMIDT,
LEONARD W. NOVANDER.